March 1, 1927.
G. H. F. HOLY
1,619,345
RESILIENT DRIVING CONNECTION
Filed May 11, 1921
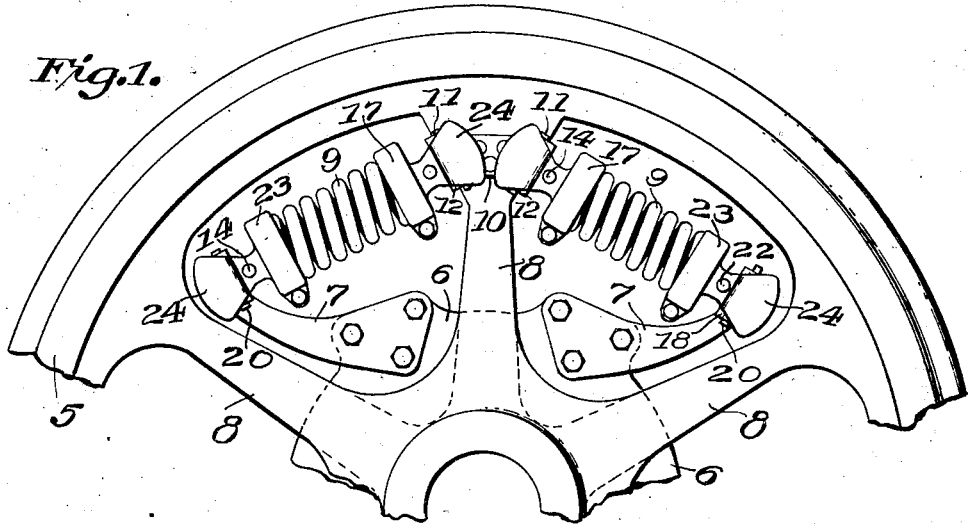
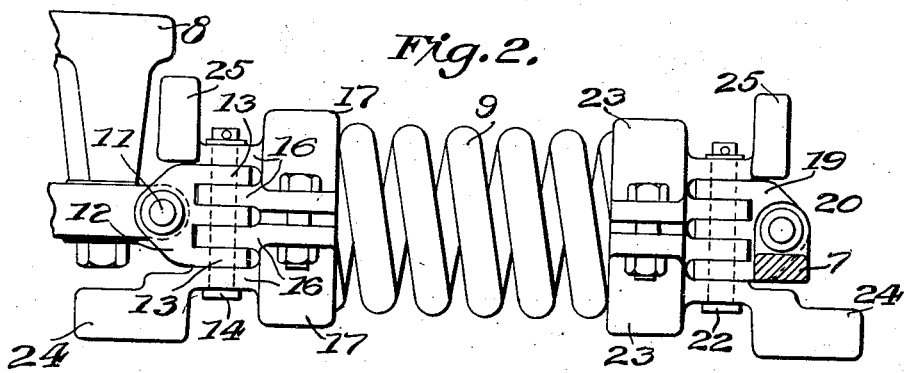
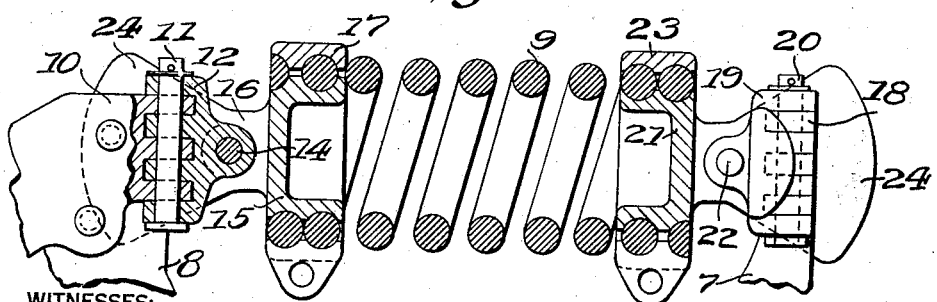
WITNESSES:
INVENTOR
George H.F. Holy,
BY
ATTORNEY Patented Mar. 1, 1927.

1,619,345

UNITED STATES PATENT OFFICE.

GEORGE H. F. HOLY, OF PITTSBURGH, PENNSYLVANIA, ASSIGNOR TO WESTINGHOUSE ELECTRIC & MANUFACTURING COMPANY, A CORPORATION OF PENNSYLVANIA.

RESILIENT DRIVING CONNECTION.

Application filed May 11, 1921. Serial No. 468,572.

My invention relates to resilient driving connections, such as are interposed between the propelling motors and the driving wheels of railway vehicles and more particularly to driving connections of a type similar to that disclosed in Patent No. 1,089,168, issued on March 3, 1918 to the Westinghouse Electric & Manufacturing Company, as assignee, wherein tangentially disposed coil springs are interposed between the driving and the driven members.

The object of my invention is to provide means for eliminating or compensating for such stresses as are imposed upon the springs as a result of relative axial or radial movements between the driving and the driven members or as a result of centrifugal forces that are incidental to the operation of the driving mechanism.

Generally stated, my invention comprises means for supporting the ends of the springs in such manner that the springs shall have substantially universal movement in order that symmetrical relation may be maintained between the springs and their seats, thereby protecting the springs against strains which would otherwise be imposed upon them as a result of the abnormal conditions above enumerated.

As shown in the drawing,

Figure 1 is a view, in side elevation, of a portion of a locomotive driving wheel embodying my invention, and Figs. 2 and 3 are a plan and a longitudinal sectional view, respectively, of a spring element built in accordance with my invention.

For convenience of illustration, I have shown my invention as applied to a driving mechanism consisting of a locomotive wheel 5 that is driven by means of a motor (not shown) through a quill member 6 that is provided with arms 7, the outer ends of which are so disposed as to lie substantially opposite the outer ends of the spokes 8 of the driving wheels 5. Helical springs 9 are interposed between the quill arms 7 and the spokes 8.

Alternate spokes 8 are provided with hinge members 10 which have perforated extensions, as shown in Fig. 3, through which hinge pins 11 extend. A hinge member 12 is pivotally supported by the members 10 and 11 in the manner shown and is provided with extensions 13 for the reception of a hinge bolt 14.

A seating block 15 is provided with perforated extensions 16 that serve as a connection by means of which it is supported upon the pin 14 and the hinge member 12. It will be seen that the seating block 15 may move about the pin 14 as a pivot and also about the pin 11, such movements taking place in planes that are at right angles to each other.

A clamping member 17 is provided for securely attaching the spring to the seating block. The spring may be either slid upon the seating block and the clamping member be then tightened or the spring may be screwed into place by reason of the screw-threaded formation of the outer face of the seating block and of the inner face of the clamping member.

At its opposite end, the spring is secured to the arm 7 that is provided with extensions 18 to serve for supporting a hinge member 19 by means of a bolt 20, and the hinge member 19, in turn, supports a seating block 21 by means of a hinge pin 22. The hinge arrangement at this end of the spring is substantially the same as that heretofore described for the opposite end thereof, and clamping ring 23 corresponds, in construction, to the clamping ring 17.

The seating blocks 15 and 21 are provided with weighted extensions 24 and 25 that serve to counteract the centrifugal force imposed upon the main portions of the springs 9. The counter-weights, however, form no part of the present invention.

It is obvious that changes may be made in the general arrangement of the device without sacrificing those features which are essential to the successful operation thereof.

I claim as my invention:

1. A resilient driving connection comprising a coil-spring member having one end provided with a seat that is pivotally supported for universal movement, the spring being rigidly secured in operative position.

2. The combination with a rotatable driving member and a rotatable driven member, of a resilient member interposed therebetween and seating blocks for the resilient member, the said blocks having hinge connections with the said driving and driven members, respectively, and the resilient members being rigidly secured to the seating blocks.

3. The combination with a rotatable driving and a rotatable driven member, of a resilient element interposed therebetween and having its opposite ends connected to the respective rotatable members through hinged seating blocks, one of said blocks being pivotally mounted for angular movement in a plane parallel to the axis of the rotatable members and the other of the blocks being mounted for angular movement in a plane extending radially from said axis.

4. The combination with a rotatable driving and a rotatable driven member, of a resilient element interposed therebetween and having its opposite ends connected to the respective rotatable members through seating blocks, one of said blocks being mounted for universal movement and the other having movement axially of the rotatable members, the resilient members being rigidly secured to the seating blocks and the blocks being positively secured in operative position.

5. The combination with rotatable driving and driven members, of brackets, hinged connections for securing the brackets to the driving and to the driven members respectively and a yielding connection interposed therebetween comprising a resilient member secured adjacent to each of its ends to one of said brackets.

6. The combination with driving and driven members, of a helical spring interposed therebetween, a seating block for one end of the spring, and two relatively angularly disposed hinge connections between the said block and one of the said first named members.

7. The combination with driving and driven members, of a helical spring interposed therebetween, a seating block for each end of the spring, and relatively angularly displaced hinge connections between the seating blocks and the said driving and driven members.

In testimony whereof, I have hereunto subscribed my name this 26th day of April, 1921.

GEORGE H. F. HOLY.